United States Patent
Krishnaswamy et al.

(10) Patent No.: US 10,742,709 B2
(45) Date of Patent: Aug. 11, 2020

(54) PROVIDING AND USING QUALITY INDICATORS IN CONFERENCES FOR MITIGATION ACTIVITIES

(71) Applicant: Avaya Inc., Santa Clara, CA (US)

(72) Inventors: Venkatesh Krishnaswamy, Holmdel, NJ (US); Parameshwaran Krishnan, Basking Ridge, NJ (US); Navjot Singh, Somerset, NJ (US)

(73) Assignee: Avaya Inc., Santa Clara, CA (US)

( * ) Notice: Subject to any disclaimer, the term of this patent is extended or adjusted under 35 U.S.C. 154(b) by 0 days.

(21) Appl. No.: 14/624,243

(22) Filed: Feb. 17, 2015

(65) Prior Publication Data

US 2015/0264310 A1     Sep. 17, 2015

Related U.S. Application Data

(60) Provisional application No. 61/953,483, filed on Mar. 14, 2014.

(51) Int. Cl.
*H04L 29/06* (2006.01)
*H04L 12/18* (2006.01)
*H04N 7/15* (2006.01)

(52) U.S. Cl.
CPC .......... *H04L 65/80* (2013.01); *H04L 12/1822* (2013.01); *H04L 12/1827* (2013.01); *H04L 65/4038* (2013.01); *H04N 7/155* (2013.01)

(58) Field of Classification Search
USPC ..................................................... 348/14.12
See application file for complete search history.

(56) References Cited

U.S. PATENT DOCUMENTS

| | | | | |
|---|---|---|---|---|
| 9,264,665 | B2 * | 2/2016 | Amano | H04N 7/15 |
| 2002/0161578 | A1 * | 10/2002 | Saindon | G10L 15/26 |
| | | | | 704/235 |
| 2004/0190500 | A1 * | 9/2004 | Wratten | H04M 7/128 |
| | | | | 370/352 |
| 2008/0084969 | A1 * | 4/2008 | Moore | H04L 47/10 |
| | | | | 379/52 |
| 2012/0128322 | A1 * | 5/2012 | Shaffer | H04N 9/8205 |
| | | | | 386/241 |
| 2012/0300658 | A1 * | 11/2012 | Sloyer | H04L 12/1827 |
| | | | | 370/252 |
| 2014/0214426 | A1 * | 7/2014 | Kanevsky | G10L 15/08 |
| | | | | 704/257 |

OTHER PUBLICATIONS

Official Action with English Translation for German Patent Application No. 102015103358.5, dated Dec. 13, 2016 10 pages.
(Continued)

*Primary Examiner* — Amal S Zenati
(74) *Attorney, Agent, or Firm* — Sheridan Ross P.C.

(57) ABSTRACT

Conferences are a popular way to hold meetings and presentations when the participants are not required to be physically together. However, the quality of a conference can vary based on a particular user's endpoint configuration, connection, network, conference content, and other factors. Providing a user with the ability to indicate a quality issue, as determined by the user, allows other users and systems to become aware that a user is experiencing quality issues and optionally take action to correct the issue.

20 Claims, 4 Drawing Sheets

(56) References Cited

OTHER PUBLICATIONS

Official Action with English Translation for German Patent Application No. 102015103358.5, dated May 3, 2017 5 pages.
Official Action for German Patent Application No. 102015103358.5, dated Aug. 7, 2017 5 pages.
Notice of Grant for German Patent Application No. 102015103358.5, dated Jan. 8, 2018 9 pages.
Official Action for U.S. Appl. No. 806/MUM/2015, dated Nov. 27, 2019 8 pages.

* cited by examiner

PROVIDING AND USING QUALITY INDICATORS IN CONFERENCES FOR MITIGATION ACTIVITIES

CROSS-REFERENCE TO RELATED APPLICATIONS

The present application claims the benefit of Provisional Patent Application No. 61/953,483, filed on Mar. 14, 2014, and is incorporated herein by reference in its entirety.

FIELD OF THE DISCLOSURE

The present disclosure is generally directed toward electronic communications and more specifically for electronic communications utilized for conferencing parties.

BACKGROUND

Video and audio quality in a conference ultimately impacts the user's overall experience and, therefore, whether the conference was successful. The real-time nature of audio and video traffic in a live conference make their management important. Video requires more data and, therefore, is more likely to be impacted by poor quality, especially when bandwidth becomes constrained.

While users may tolerate portions of a video with poor quality, such as video comprising a single person speaking (e.g., a broadcast), other videos require high quality for successfully interactive participation. For example, a video of a surgical procedure may be incomprehensible if fine detail is omitted or if the frame rate drops to the point that subtle actions are omitted. It is also common for a conference to include images of a live presentation, which may include a screen receiving projected images. If those images include graphs, reports, documents, or other finely detailed information, the content may be of little value if the video quality is not sufficient to convey the images in a usable form.

Conference quality can be affected by a number of factors. One of the most important factors is the connection speed of each participant's system and codecs used by each participant. When packets of video conference data drop, the quality of the conference decreases, and the process of resending the packets is not always error-free. However, other areas of creating, transmitting, and receiving teleconferencing can be subject to failure, overloading, misconfiguration, or other issue that resulting in a poor quality conference for one or more participants.

SUMMARY

It is with respect to the above issues and other problems that the embodiments presented herein were contemplated.

In one embodiment, a user's device is provided with an input, from the user, during a video, audio, or multimedia conference. The user's input triggers a quality signal that, among other things, may provide an indication to the other participants of the conference that the user is experiencing quality issues. In one embodiment, a button or user input may be presented to a user on their endpoint device that allows the participant to indicate that the quality of the received audio, video, or both is sub-optimal, unintelligible, or otherwise negatively impacting the participant's overall conference experience. The threshold of quality that results in the user's input is user determined and may be based, in whole or in part, on the content of the presentation, the participant's tolerance, the specific channel in which this problem exists, and so on. For example, a poor video signal may be acceptable to a user if the video is of a speaker talking and if the audio signal remains of acceptable quality. As another example, a conference where the participants are engaged in a discussion and, much like many in-person conferences, interrupt or talk over other participants, may be determined by a user to be of poor quality if the audio signal is delayed, even slightly, if the delay puts the participant at a disadvantage during more lively and interactive portions of the conference.

The quality feedback of the present disclosure may be provided as an indicator to other participants in the conference, a system administrator, and/or the conference bridge/server itself. With the knowledge that one or more participants are having quality issues, actions can be taken to correct and/or mitigate the issues. For example, a conference server may perform one or more of the following:

Begin recording media at the source, media server, and/or recipient, such as for troubleshooting and/or later playback;

Multiple recipient recordings, such as for fault isolation;

Assess where the problem might exist (e.g., if all or any participants indicate quality issues, the problem may be with the media server or source);

Begin or continue annotation of the conference transcript; and

Begin or continue with real time transcription via speech-to-text, which may be delivered on the same or alternate data channel to only those participants having issues, all participants, self-selected participants, or other subset of participants.

The foregoing may be fully automated remedial measures performed by the conference server to initiate a quality management action without requiring any human input or, alternatively, suggesting an action for confirmation and approval by a human user (e.g., system administrator, conference host, conference participant(s), etc.).

The quality feedback, when provided to other participants, enables those other participants to understand the extent of quality problems for the conference as a whole. Instead of prior art systems that just provided quality feedback to the specific user reporting quality issues, the present invention provides a simple and effective user interface (UI) that can inform all participants as to whether or not other participants have reported quality issues and, if so, the extent of those quality issues.

In one embodiment, a conferencing system is disclosed, comprising: a network interface configured to receive a quality signal from a first endpoint involved in a conference, the quality signal being sent by the first endpoint in response to a user input received at the first endpoint during or immediately after the conference; a conference server configured to receive the quality signal from the first endpoint via the network interface and; upon receiving the quality signal, causing each of a number of secondary endpoints involved in the conference to present indicia of the quality signal, and at least one of the secondary endpoints to execute a quality management action that causes (i) the conference to be recorded, (ii) launching a service level agreement monitor application, and (iii) rerouting at least a portion of the conference.

In another embodiment, a server is disclosed, comprising: a network interface configured to receive a quality signal from a first endpoint involved in a conference, the quality signal being sent by the first endpoint in response to a user input received at the first endpoint during or immediately after the conference; a processor configured to, upon receiving the quality signal, causing each of a number of secondary endpoints involved in the conference to present indicia of the quality signal and execute a quality management action that includes at least one of: (i) recording the conference, (ii) launch a service level agreement monitor application, and (iii) reroute at least a portion of the conference.

In yet another embodiment a method of managing a conference for a number of endpoints, comprising: receiving, at a conferencing server, a quality signal from a first endpoint of the number of endpoints involved in a conference, the quality signal being sent by the first endpoint in response to a user input received at the first endpoint during or immediately after the conference; and upon receiving the quality signal causing the number of endpoints to present indicia of the quality signal and executing, by the teleconferencing server, a quality management action that includes at least one of: (i) recording the conference, (ii) launching a service level agreement monitor application, and (iii) rerouting at least a portion of the conference.

The phrases "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The term "computer-readable medium" as used herein refers to any tangible storage that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, or any other medium from which a computer can read. When the computer-readable media is configured as a database, it is to be understood that the database may be any type of database, such as relational, hierarchical, object-oriented, and/or the like. Accordingly, the disclosure is considered to include a tangible storage medium and prior art-recognized equivalents and successor media, in which the software implementations of the present disclosure are stored.

The terms "determine," "calculate," and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the disclosure is described in terms of exemplary embodiments, it should be appreciated that other aspects of the disclosure can be separately claimed.

BRIEF DESCRIPTION OF THE DRAWINGS

The present disclosure is described in conjunction with the appended figures.

DETAILED DESCRIPTION

The ensuing description provides embodiments only, and is not intended to limit the scope, applicability, or configuration of the claims. Rather, the ensuing description will provide those skilled in the art with an enabling description for implementing the embodiments. It being understood that various changes may be made in the function and arrangement of elements without departing from the spirit and scope of the appended claims.

Any reference in the description comprising an element number, without a subelement identifier when a subelement identifiers exist in the figures, when used in the plural is intended to reference any two or more elements with a like element number. When such a reference is made in the singular form, it is intended to reference one of the elements with the like element number without limitation to a specific one of the elements. Any explicit usage herein to the contrary or providing further qualification or identification shall take precedence.

The exemplary systems and methods of this disclosure will also be described in relation to analysis software, modules, and associated analysis hardware. However, to avoid unnecessarily obscuring the present disclosure, the following description omits well-known structures, components and devices that may be shown in block diagram form, and are well known, or are otherwise summarized.

For purposes of explanation, numerous details are set forth in order to provide a thorough understanding of the present disclosure. It should be appreciated, however, that the present disclosure may be practiced in a variety of ways beyond the specific details set forth herein.

Figure 1:
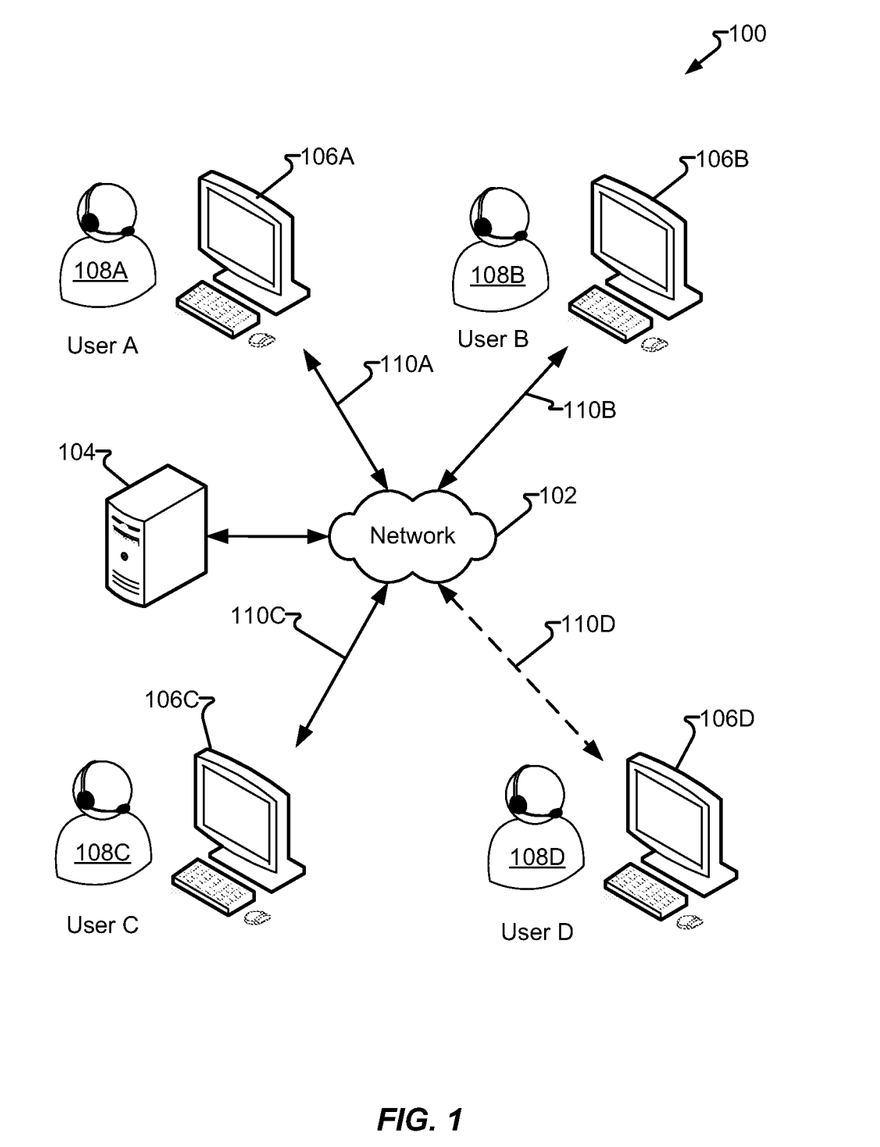
FIG. 1 depicts a conference system in accordance with embodiments of the present disclosure.

FIG. 1 depicts conference system 100 in accordance with embodiments of the present disclosure. In one embodiment, users 108 use endpoints 106 to connect to network 102 over their associated connections 110. Endpoints 106 are electronic devices operable to present at least a portion of a conference to at least one user 108. Endpoints 106 may also provide teleconferencing input from users 108 such that at least one endpoint 106 may provide video, audio, files, etc. for inclusion in the conference. In another embodiment, endpoints 106 comprise a display (video, audio, and/or tactile) operable to present indicia of a quality signal associated with another user 108 and their respective endpoint 108. Endpoints 106 include, but are not limited to, a telephone, smart phone/cellular phone, computer (desktop, notebook, tablet, etc.), and composite devices (e.g., headset and base station).

Connection 110 may be determined, in whole or in part, by the type of device embodied by a particular endpoint 108. For example, when endpoint 106A is embodied as a cellular phone, connection 110A may comprise a cellular connectivity and network 102 may then further comprise a cellular network. As can be appreciated, the user of one particular communication 110 (e.g., WiFi, infrared, Bluetooth, cellular, Ethernet, etc.) may further incorporate other or alternative types of network 102 (e.g., Internet, WAN, LAN, etc.). In other embodiments, the use of a particular communication 110 and, at least a particular portion of network 102, may be a matter of implementation choice. For example, endpoint 106A may be a smart phone capable of receiving a conference over a cellular communication network portion of network 102, however, endpoint 106A may be configured to utilize WiFi connectivity 110A to access network 102 and thereby omit cellular portions while endpoint 106A is configured to access the conference via WiFi portion of network 102.

Network 102, as introduced above, is variously embodied. Embodiments, of network 102 include, but are not limited to Internet, VPN, WAN, LAN, cellular, and wired and/or wireless networks operable to convey electronic communication data between endpoints 106 and/or server 104. In one embodiment, server 104 provides connectivity and/or content with respect to a conference. For example, server 104 may provide administration functions (e.g., invite, add, remove, floor control, etc.), content creation (e.g., camera control, audio control, insertion of previously created content such as presentation decks, videos, etc.), and/or content presentation (e.g., encoding/compression, streaming, etc.). Server 104 may be embodied as a dedicated or shared device having at least one microprocessor and include, without limitation, a stand-alone server, multiple servers, and shared computing platform. For example, server 104 and a particular endpoint 106 may both operate on the same computing device.

In another embodiment, connection 110D (illustrated as a dashed line) is at least partially compromised such that the conference presented on endpoint 106D is problematic as determined by user 108D. One or more users 108A-108C may infer a meaning, typically negative, to the lack of engagement from user 108D (e.g., user D is uninterested, user D is asleep, etc.). However, if users 108A-108C are made aware that user 108D is having quality issues associated with the conference any lack of response or delayed response by user 108D will be better understood by users 108A-108C as a conference limitation. Communication errors in the presentation of the conference may also be mitigated. For example, user 108A may assume users 108B, 108C heard and/or saw a particular portion of the conference (e.g., "We need to move next week's meeting up an hour.") but, seeing indicia associated with user 108D indicating quality issues, seek confirmation from user 108D that the portion was received (e.g., "User D, did you catch that?").

Figure 2:
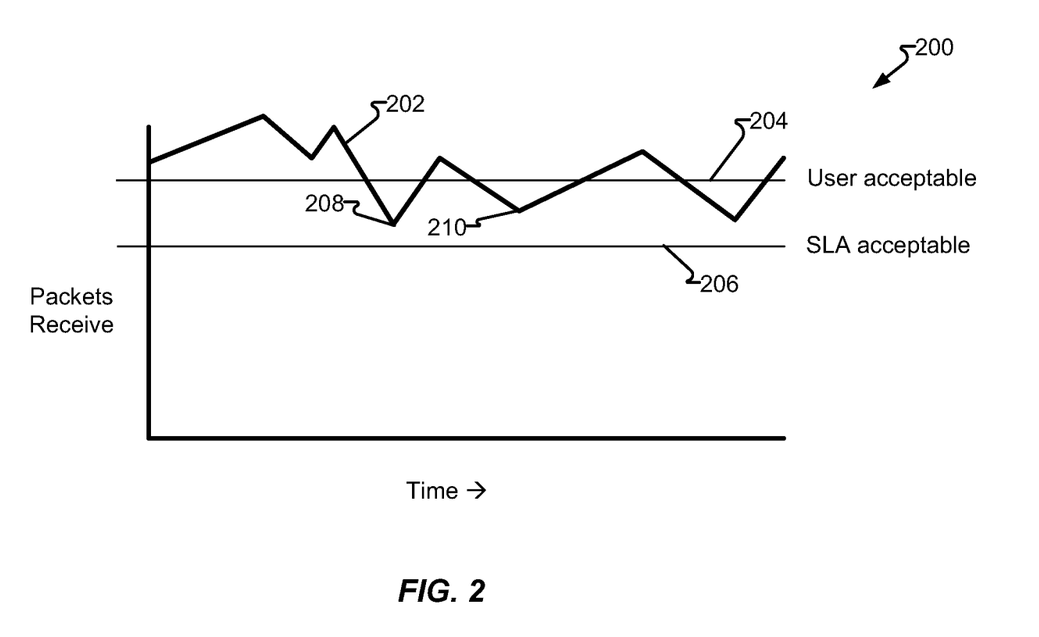
FIG. 2 depicts a packet reception graph in accordance with embodiments of the present disclosure.

FIG. 2 depicts packet reception graph 200 in accordance with embodiments of the present disclosure. In one embodiment, graph 200 represents the packet reception of user 108D. Graph 200 may represent other quality indicators and/or combination of quality indicators in addition to packets received, such as timeliness, packets received versus packets dropped, etc.

Graph 200 comprises a user determined acceptable quality line 204. If the packets received fall below this line, whether or not the user is aware of the number of packets received, the user finds the conference problematic. The line 204 is illustrated as straight for the portion illustrated by graph 200, however, line 204 may vary, such as by comprising a number of stair-steps. For example, a conference presentation requiring fine visual detail (e.g., documents projected on a screen and captured by a camera for the conference) may be associated with line 204 being higher than if the conference does not require a high level of visual detail (e.g., a presenter stands at a podium and speaks). Each of users 108 may have their own preference as to acceptability and their own line 204 which may be the same or different from any other user 108.

A service level agreement (SLA) may be in place that specifies a minimum threshold, such as SLA acceptable line 206. A SLA monitoring application may be running or launched, such as one potential quality management actions. Systems are well known to address data streams that fall below an SLA threshold and may be independently operated along with the embodiments disclosed herein. For example, if packet count line 202 falls below SLA line 206, which would also be below user acceptable line 204, a network administrator could be notified in accordance with an SLA. Additionally, and in accordance with certain embodiments disclosed herein, other users 108 participating in the conference could be notified that the particular user associated with packet count line 202 is having difficulties.

Figure 3:
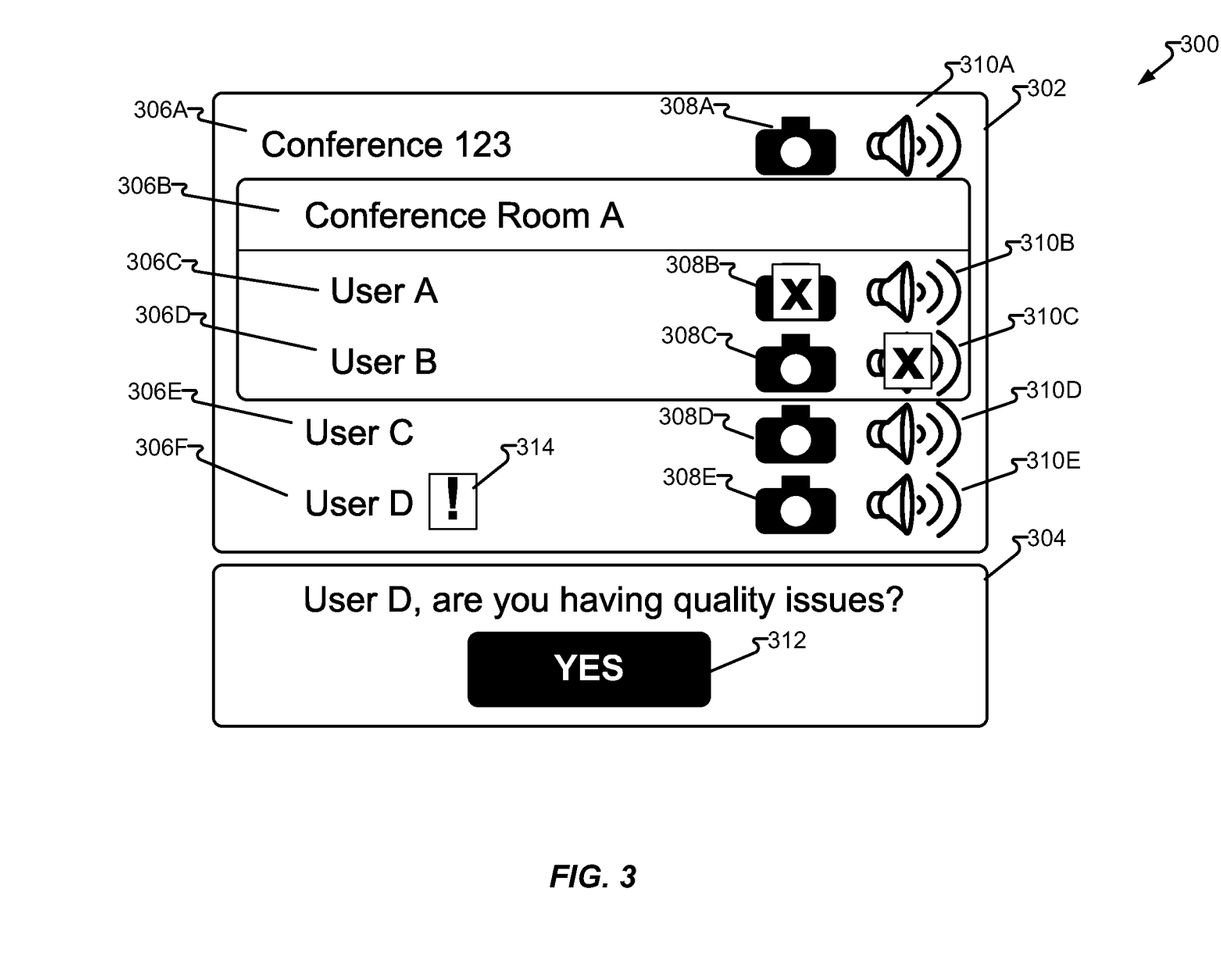
FIG. 3 depicts an endpoint display in accordance with embodiments of the present disclosure.
Figure 4:
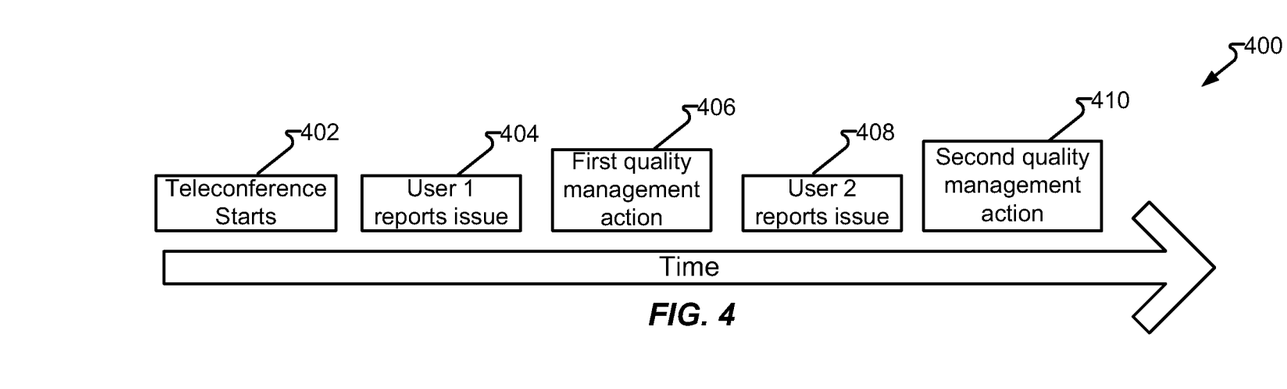
FIG. 4 depicts a first quality management timeline in accordance with embodiments of the present disclosure.
Figure 5:
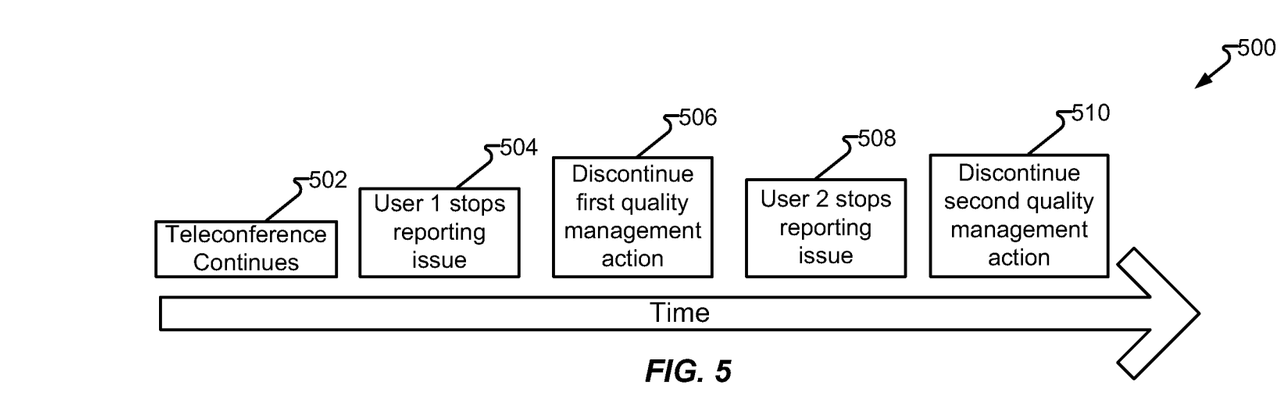
FIG. 5 depicts a second quality management timeline in accordance with embodiments of the present disclosure.

In another embodiment, user 108D causes a quality signal to be sent at point 208, as will be disclosed in more detail with respect to FIGS. 3-5. Users 108A-108C receive an indication of user 108D and the quality issues associated with that particular user. Additionally, a first quality management action is launched which is designed to improve quality of the conference as observed at by user 108D at endpoint 106D. For example, server 104 may stop sending conference status updates (e.g., who is speaking, who joined, who dropped, etc.) to user 108D in an effort to reduce packet traffic associated with non-conference content.

In another embodiment, user 106D causes a second quality signal 210 to be sent. A second quality management action is launched, such as re-routing of some or all of the conference content.

FIG. 3 depicts an endpoint display 300 in accordance with embodiments of the present disclosure. In one embodiment, status panel 302 displays participants 306 in the conference and statuses of participants 306. In another embodiment, quality signal panel 304 displays button 312 whereby a user 108 may report a quality issue and trigger a quality signal. In other embodiments, button 312 may be used as a confirmation and/or used affirmatively for the reporting of good quality, whereby the absence of the quality signal is understood to indicate poor quality. When a quality signal is sent, button 312 may automatically reset after a period of time and User D 108D is then prompted to again select button 312 or asked to confirm if they are still having issues. Quality panel 304 and button 312 are provided on endpoints 106 so that users 108 may report quality issues with the conference.

Status panel 302 may be provided to endpoints 106 by default, as a matter of user choice (e.g., user determined hide, display, minimize, etc.), upon an update event (e.g., user D recently sent a quality signal), periodically, and/or other event. In one embodiment, icon 314 is associated with user 306F to indicate a quality issue being reported by user 306F (e.g., "User D" 108D). Additionally, status panel 302 may be provided to non-participants (e.g., system administrators). Status panel 302 may include other indicators such as the presence of video/camera icon 308 and the presence of audio/microphone icon 310. For example user 306C presence indicates no camera or no operational camera icon 308B. User 306D is indicating no microphone or sound icon 310C. However users 306C, 306D are grouped with group panel 306B indicating commonality of location (e.g., "Conference Room A"). Therefore, observers of panel 302 may conclude that users 306C, 306D, between the two of them, have an operational camera/video and speaker/microphone. In other embodiments, the system may infer that two or more users, (e.g., users 306C and 306D) share a camera and/or microphone and conclude that their common location (e.g., Conference Room A) has audio and/or video problems. As a further embodiment, icon 314 may be audible (e.g., tone, computer generated/playback spoken message, etc.) and/or tactile (e.g., vibration, vibration pattern, Braille, etc.)

Icon 314 may be a visual indicator, such as the illustrated exclamation mark or other indicator that may be interpreted as a quality signal by an observer of status panel 302. For example, icon 314 may be a color, flash of text (e.g., the user's identifier ("User D"), the status ("poor quality reception")), gradient, or other indicator associated with a quality issue perceived by user 306F. Icon 314 may be further implemented into a channel icon. For example, user 306F having audio problems and triggering a quality signal associated with audio, may cause icon 310E to flash, change color, or other symbol to indicate user 306F is having audio-specific quality issues.

FIG. 4 depicts first quality management timeline 400 in accordance with embodiments of the present disclosure. In one embodiment, at time 402 a conference starts and at some point thereafter, at time 404, user 1 reports a quality issue. In response to user 1 reporting a quality issue at time 404, first remedial action is launched at time 406.

The quality management action launched at time 406 is variously embodied and includes, but is not limited to, causing endpoints 108 to present indicia of the quality signal reported at time 404, trigger a recording of the conference by server 104, trigger recording of conference by at least one endpoint 106 not associated with the endpoint reporting at time 404, cause a speech-to-text application to be launched which may be recorded and/or inserted in to a video portion of the conference, and/or launch a SLA monitoring application. Once recorded, the problematic endpoint 108 may retrieve the recorded conference utilizing a lossless or less-loss protocol or retrieve the recorded conference at a time in which the quality issue is no longer a factor.

In another embodiment, user 2 reports a quality issue at time 408 and at some point thereafter, second quality management action is launched at time 410. The second quality management action may be the same as that launched at time 406, an extension of the first quality management action launched at time 406, and/or the same but specific to the user 2. For example, causing endpoints 108 to present indicia of the quality signal reported at time 404 and then include indicia of the quality signal reported at time 408.

In another embodiment, the second quality management action initiated at time 410 may be different from the first quality management action launched at time 406. For example, the second quality management action taken at time 410 may be specific to the occurrence of a plurality of reported quality issues. For example, if users 108A and 108B each report a quality issue and common to users 108A and 108B is a portion of network 102 (e.g., same type of network (e.g., cellular), usage of the WiFi in building C, etc.), same version of the conference software, and/or other commonality that is not common to users 108C and 108D who are not reporting quality issues, then the commonality may be a target of resolution of the quality issue and the second quality management action taken at time 410.

It should be appreciated that a single individual user 108 who reports a quality issue may cause network fault isolation or other or similar action, however, as can be further appreciated, having two or more users experiencing quality issue may more readily lead to the culprit of the quality issue. Furthermore, if a certain number or percentage of users 108, up to and including all users 108, report quality issues the second quality management action taken at time 410 may be targeted at the source, such as the conference server or other communication and/or presentation component of network 102. Second quality management action taken at time 410 may also include one or more of notifying a system administrator, launching a troubleshooting application, or, if not already launched, launching a SLA monitoring application. The second quality management action take at time 410 may additionally or alternatively include terminating and optionally restarting the conference. As a further option, restarting the conference may occur upon a changing of a state or setting of server 104, selection or configuration of network 102, and/or a setting associated with endpoints 106 designed to remedy the quality issue experienced by the plurality of users 108.

Although timeline 400 illustrates a series of events wherein only two users report issues, one at time 404 and the other at time 408, which result in two quality management actions, one at time 406 and the other at time 410, additional user reports and/or more, the same, or fewer quality management actions may be taken in response thereto without departing from the disclosure provided herein. For example, three or more users 108 may report quality issues resulting in each causing indicia of their quality to be displayed, such as on status panel 302. Three or more users may each cause separate quality management actions to be initiated. A number of users 108 above a previously determined threshold may cause a different quality management action to be initiated, such as launching of the SLA, notification of a system administrator application and/or human, or other action. Additionally, the participants, upon seeing icon 314 displayed with respect to a number of users 108, may mutually agree to terminate the conference or take other action.

In another embodiment, at least one of first quality management action 406 and second quality management action 410 may comprise, or continue, a speech-to-text application. The resulting transcript produced by the speech-to-text application may be placed (e.g., overlaid) on a portion of the video stream. As a further option, the transcript may be sent via a channel not utilized by the conference, including but not limited to, a series of live blog posts on a website or text messages, emails, etc. sent to one or more endpoints 106 having quality issues or, optionally, to endpoints 106 not having quality issues.

FIG. 5 depicts second quality management timeline 500 in accordance with embodiments of the present disclosure. Often quality issues are temporary. A component causing the quality issue may be identified action taken to repair, replace, and/or reconfigure the component, often automatically. Load on network 102 and/or server 104 may be strained to accommodate other tasks and once those tasks end, quality of the conference improves. Quality may also improve due to one or more quality management action launched at time 406 and/or 410 or the content of the conference requiring lower quality. In one embodiment, a conference continues at time 502. At some point thereafter user 1 stops reporting quality issues at time 504. It should be noted that user 1 of timeline 500 may or may not be the user 1 of timeline 400, and well as the similarities with user 2, first quality management action, and/or the second quality management action may or may not exist. In another embodiment, at time 504 the user may indicate that conference is of sufficient quality or terminate the reporting of insufficient quality. In response, at time 506 the first quality management action may be discontinued. For example, if endpoints 108 are presenting indicia of the quality signal reported at time 404 and 408, then the indicia may be removed, replaced, or altered to indicate sufficient quality or the lack of insufficient quality.

In another embodiment, user 2 stops reporting quality issues at time 508. Accordingly, at least one second quality management action may be discontinued at time 510. The second quality management action may be similar to the action taken at time 506 (e.g., stop reporting indicia of low quality to users 108 with respect to user 2). In another embodiment, the action taken at time 510 may be any one or more quality management actions still in place immediately prior to time 510.

In another embodiment, timelines 400 and 500 are mixed, such that various combinations of quality issues are reported by a number of users 108 and following or interspersed therein, a number of quality management actions may be taken and, if successful, terminated. For example, a user reports a quality issue at time 404 and first quality management action is taken at time 406, after some time user 1 may stop reporting quality issues at time 504 and at time 506 the first quality management action terminated. Other orders, additions, and subtractions of the combination of timelines 400 and 500 may be implemented without departing from the disclosure provided herein.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor (GPU or CPU) or logic circuits programmed with the instructions to perform the methods (FPGA). These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments were described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

While illustrative embodiments of the disclosure have been described in detail herein, it is to be understood that the inventive concepts may be otherwise variously embodied and employed, and that the appended claims are intended to be construed to include such variations, except as limited by the prior art.

What is claimed is:

1. A teleconferencing system, comprising:
 a network interface that communicates with a first endpoint and a number of secondary endpoints, each of which is engaged in a conference conveyed by data packets, the data packets conveying, at least, audio content of the conference in an audio channel and video content of the conference in a video channel;
 a conference server that receives a quality signal from the first endpoint via the network interface; and
 wherein the quality signal is sent from the first endpoint in response to the data packets received by the first endpoint, not being determined to be below a minimum threshold for data packets received for the conference and being determined to be insufficient in at least one of the audio channel or the video channel that is necessary to intelligibly convey a content of the conference, and wherein the quality signal is sent upon the user of the first endpoint selecting a quality indicating component presented on the first endpoint; and
 upon receiving the quality signal, causing each of a number of secondary endpoints involved in the conference to present indicia of the quality signal, and at least one of the secondary endpoints to execute a quality management action comprising at least one of (i) recording the conference or (ii) rerouting at least a portion of the conference.

2. The teleconferencing system of claim 1, wherein the quality management action comprising (i) recording the conference, further comprises signaling the conferencing server to record the conference.

3. The teleconferencing system of claim 1, wherein the conferencing server is further associated with a transmission of the conference.

4. The teleconferencing system of claim 1, wherein at least one of the secondary endpoints and the conferencing server are executable by a common device.

5. The teleconferencing system of claim 1, wherein quality management action comprising (i) recording the conference, further comprises signaling at least one of the number of secondary endpoints to record the conference.

6. The teleconferencing system of claim 1, wherein the quality management action further comprises both (i) and (ii).

7. The teleconferencing system of claim 1, wherein the quality management action further includes (iii) launching a speech-to-text application operable to produce a transcript of a speech portion of the conference.

8. The teleconferencing system of claim 7, wherein the transcript is inserted into a video portion of the conference.

9. The teleconferencing system of claim 7, wherein the transcript is sent to the first endpoint via a channel not utilized for the conference.

10. The teleconferencing system of claim 7, wherein the quality signal comprises a plurality of quality signals from each of a plurality of endpoints and wherein the conferencing server is further operable to determine a commonality of the plurality of quality signals and signal troubleshooting activities to mitigate the commonality of the plurality of quality signals; and
wherein the quality management action includes (iii) launching the speech-to-text application operable to produce the transcript of the speech portion of the conference and further includes presenting the commonality of the plurality of quality signals to a teleconferencing management application for troubleshooting.

11. A server, comprising:
a network interface configured to receive a quality signal from a first endpoint involved in a conference conveyed by data packets, the data packets conveying, at least, audio content of the conference in an audio channel and video content of the conference in a video channel, the quality signal being sent in response to the data packets received by the first endpoint, not being determined to be below a minimum threshold for data packets received for the conference and being determined to be insufficient in at least one of the audio channel or the video channel that is necessary to intelligibly convey a content of the conference, and wherein the quality signal is sent upon the user of the first endpoint selecting a quality indicating component presented on the first endpoint; and
a processor configured to, upon receiving the quality signal, cause each of a number of secondary endpoints involved in the conference to present indicia of the quality signal and execute a quality management action that includes at least one of: (i) recording the conference or (ii) reroute at least a portion of the conference.

12. The server of claim 11, wherein the quality management action comprises both (i) and (ii).

13. The server of claim 11, the server comprises one of the number of secondary endpoints.

14. The server of claim 11, wherein the processor is further configured to execute the quality management action further comprising (iii) launching a speech-to-text application operable to produce a transcript of a speech portion of the conference.

15. The server of claim 14, wherein the transcript is inserted into a video portion of the conference.

16. A method of managing a conference for a number of endpoints, comprising:
receiving, at a conferencing server, a quality signal from a first endpoint of the number of endpoints involved in a conference conveyed by data packets, the data packets conveying, at least, audio content of the conference in an audio channel and video content of the conference in a video channel, the quality signal being sent in response to the data packets received by the first endpoint, not being determined to be below a minimum threshold for data packets received for the conference and being determined to be insufficient in at least one of the audio channel or the video channel necessary to intelligibly convey a content of the conference, and wherein the quality signal is sent upon the user of the first endpoint selecting a quality indicating component presented on the first endpoint; and
upon receiving the quality signal causing the number of endpoints to present indicia of the quality signal and executing, by the conferencing server, a quality management action that includes at least one of: (i) recording the conference or (ii) rerouting at least a portion of the conference.

17. The method of claim 16, wherein the quality management action further comprises (iii) launching a speech-to-text application operable to produce a transcript of a speech portion of the conference.

18. The method of claim 17, wherein the transcript is inserted into a video portion of the conference.

19. The method of claim 17, wherein the quality management action further includes sending the transcript to at least the first endpoint via a channel not utilized by the conference.

20. The method of claim 16, further comprising:
receiving, at the conferencing server, a revocation signal associated with the received quality signal; and
upon receiving the revocation signal, terminating the quality management action.

* * * * *